US008442445B2

(12) United States Patent
Mody et al.

(10) Patent No.: US 8,442,445 B2
(45) Date of Patent: *May 14, 2013

(54) PROTOCOL REFERENCE MODEL, SECURITY AND INTER-OPERABILITY IN A COGNITIVE COMMUNICATIONS SYSTEM

(75) Inventors: Apurva N. Mody, Lowell, MA (US); Matthew J. Sherman, Succasunna, NJ (US); Ranga Reddy, Bridgewater, NJ (US); Thomas Kiernan, Little Silver, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1281 days.

This patent is subject to a terminal disclaimer.

(21) Appl. No.: 12/189,682

(22) Filed: Aug. 11, 2008

(65) Prior Publication Data

US 2009/0124208 A1 May 14, 2009

Related U.S. Application Data

(60) Provisional application No. 61/002,668, filed on Nov. 9, 2007.

(51) Int. Cl.
*H04B 17/00* (2006.01)

(52) U.S. Cl.
USPC .................. 455/67.11; 455/450; 370/328

(58) Field of Classification Search .................. None
See application file for complete search history.

(56) References Cited

U.S. PATENT DOCUMENTS

| | | | |
|---|---|---|---|
| 6,665,719 | B1 | 12/2003 | Isoda |
| 6,839,147 | B1 | 1/2005 | Umebayashi |
| 7,000,024 | B1 | 2/2006 | Champagne et al. |
| 7,269,127 | B2 | 9/2007 | Mody et al. |
| 7,424,268 | B2 * | 9/2008 | Diener et al. ............ 455/62 |
| 7,583,611 | B1 * | 9/2009 | Robertson et al. ....... 370/252 |

(Continued)

OTHER PUBLICATIONS

IEEE P802.22™ /D0.1 Draft Standard for Wireless Regional Area Networks Part 22: Cognitive Wireless RAN Medium Access Control (MAC) and Physical Layer (PHY) specifications: Policies and procedures for operation in the TV Bands, May 2006, pp. 1-299.*

(Continued)

*Primary Examiner* — Nay A Maung
*Assistant Examiner* — Alejandro Rivero
(74) *Attorney, Agent, or Firm* — Finch & Maloney PLLC; Neil F. Maloney; Daniel J. Long

(57) ABSTRACT

Various cognitive communications system architectures and their corresponding Protocol Reference Models (PRMs) are disclosed. Such PRMs incorporate a Cognitive Plane in addition to conventional Data and Management Planes. The additional Cognitive Plane functionality may include, for example, spectrum sensing, spectrum management, geolocation, and security functions. The Cognitive Plane may further include a Policy Engine and a Learning and Reasoning Module. In some embodiments, Management Plane functions may be effectively combined to form a database of primitives (and their respective values) called a Management Information Base (MIB). In addition, techniques are provided by which various components of cognitive and non-cognitive, as well as mesh-enabled and non-mesh-enabled nodes in a network, inter-operate with each other. The architectures allow a Spectrum Manager (or Signal Space Manager) to combine information from various network layers (e.g., PHY/MAC Layers, Spectrum Sensing Function, Geolocation Function, and/or Security Sublayers), and to make informed decisions on spectrum utilization.

21 Claims, 8 Drawing Sheets

U.S. PATENT DOCUMENTS

| | | | |
|---|---|---|---|
| 7,756,058 B2 * | 7/2010 | Cordeiro et al. | 370/252 |
| 7,917,121 B2 * | 3/2011 | Kim et al. | 455/343.2 |
| 8,050,219 B2 * | 11/2011 | Thakare | 370/328 |
| 2004/0148391 A1 * | 7/2004 | Lake et al. | 709/224 |
| 2006/0153235 A1 * | 7/2006 | Kiernan et al. | 370/469 |
| 2007/0213046 A1 | 9/2007 | Li et al. | |
| 2007/0226326 A1 | 9/2007 | Gili et al. | |
| 2007/0274275 A1 | 11/2007 | Laroia et al. | |
| 2007/0274276 A1 | 11/2007 | Laroia et al. | |
| 2007/0286111 A1 | 12/2007 | Corson et al. | |
| 2007/0291714 A1 | 12/2007 | Laroia et al. | |
| 2007/0291715 A1 | 12/2007 | Laroia et al. | |
| 2008/0002647 A1 | 1/2008 | Laroia et al. | |
| 2008/0002648 A1 | 1/2008 | Laroia et al. | |
| 2008/0024336 A1 | 1/2008 | Park et al. | |
| 2008/0031193 A1 | 2/2008 | Laroia et al. | |
| 2008/0034171 A1 | 2/2008 | Song et al. | |
| 2008/0037487 A1 | 2/2008 | Li et al. | |
| 2008/0039066 A1 | 2/2008 | Laroia et al. | |
| 2009/0124205 A1 * | 5/2009 | Aboba et al. | 455/63.1 |

OTHER PUBLICATIONS

Lim et al., IEEE 802.22-07/0257r10 MAC-SM-SSF Interface, Jul. 7, 2007, pp. 1-22.*

Mishra et al., Cooperative Sensing among Cognitive Radios, Jun. 2006, IEEE ICC 2006 proceedings vol. 4, pp. 1658-1663.*

Akyildiz et al., NeXt generation/dynamic spectrum access/cognitive radio wireless networks: A survey, May 17, 2006, Computer Networks 50 (2006), pp. 2127-2159.*

Cavalcanti et al., IEEE 802.22-07/xxxxr0 Updated Figures for draft 0.3, May 2007, pp. 1-4.*

Kim et al., IEEE 802.22-07/0523r0 WRAN Protocol Reference Model (PRM), Nov. 7, 2007, pp. 1-9.*

Ko et al., IEEE 802.22-07/0523r1 WRAN Protocol Reference Model (PRM), Nov. 7, 2007, pp. 1-8.*

Ko et al., IEEE 802.22-07/0523r3 WRAN Protocol Reference Model (PRM), Nov. 7, 2007, pp. 1-12.*

Stevenson et al., IEEE 802.22-05/0007r47 Functional Requirements for the 802.22 WRAN Standard, Jan. 2006, pp. 1-49.*

IEEE P802.22/D04.3 Draft Standard for Wireless Regional Area Networks Part 22: Cognitive Wireless RAN Medium Access Control (MAC) and Physical Layer (PHY) specifications: Policies and procedures for operation in the TV Bands, Nov. 2007, pp. 1-350.*

IEEE P802.22/WD05.0 Draft Standard for Wireless Regional Area Networks Part 22: Cognitive Wireless RAN Medium Access Control (MAC) and Physical Layer (PHY) specifications: Policies and procedures for operation in the TV Bands, May 11, 2006, pp. 1-372.*

Fitzek et al., Cognitive Wireless Networks: Concepts, Methodologies and Visions Inspiring the Age of Enlightenment of Wireless Communications, Nov. 9, 2007, Springer, pp. 271-284.*

Manoj et al., Cognet: A Cognitive Complete Knowledge Network System, Dec. 2008, IEEE Wireless Communications, pp. 81-88.*

Raychaudhuri et al., CogNet—An Architectural Foundation for Experimental Cognitive Radio Networks within the Future Internet, Nov. 27, 2006, Proceedings of First ACM/IEEE International Workshop on Mobility in the Evolving Internet Architecture, pp. 11-16.*

International Search Report and Written Opinion dated Jan. 15, 2009 received in a related PCT Application, 8 pages.

Cordeiro et al., "IEEE 80222: An Introduction to the First Wireless Standard based on Cognitive Radios", Journal of Communications, vol. 1, No. 1, Apr. 2006, 10 pages.

Sherman, et al., "IEEE Standards Supporting Cognitive Radio and Networks, Dynamic Spectrum Access, and Coexistence", IEEE Communications Magazine, Jul. 2008, 8 pages.

Mody et al., "Recent Advances in Cognitive Communications", IEEE Communications Magazine, Oct. 2007, 8 pages.

"IEEE P802.22/D04.3 Draft Standard for Wireless Regional Area Networks Part 22: Cognitive Wireless RAN Medium Access Control (MAC) and Physical Layer (PHY) specifications: Policies and procedures for operation in the TV Bands", prepared by the IEEE 802.22 Working Group of the LAN/MAN Standards Committee, 350 pages (see, for example, Figure 6 on p. 13.

"IEEE P802.22/WDv05.0 Draft Standard for Wireless Regional Area Networks Part 22: Cognitive Wireless RAN Medium Access Control (MAC) and Physical Layer (PHY) specifications: Policies and procedures for operation in the TV Bands", prepared by the IEEE 802.22 Working Group of the LAN/MAN Standards Committee, 372 pages (see, for example, Figure 8 on p. 13).

Liu Jinnan Huawei Hisi, "IEEE P802.22 Wireless RANs Dynamic Sensing Schemes,", Sep. 5, 2007, 11 pages.

Mody et al., "IEEE P802.22 Wireless RANs Protocol Reference Model Enhancements in 802.22", May 15, 2005, 4 pages.

Mody et al., "IEEE 802.22 Wireless RANs Meeting Minutes of the Security Ad-Hoc Group in 802.22", Jun. 9, 2008, 3 pages.

* cited by examiner

PROTOCOL REFERENCE MODEL, SECURITY AND INTER-OPERABILITY IN A COGNITIVE COMMUNICATIONS SYSTEM

RELATED APPLICATIONS

This application claims the benefit of U.S. Provisional Application No. 61/002,668 filed Nov. 9, 2007, which is herein incorporated by reference in its entirety.

FIELD OF THE INVENTION

The invention relates to communication systems, and more particularly, to cognitive communications systems.

BACKGROUND OF THE INVENTION

A conventional communications system generally includes one or more Layers or an Open Systems Interconnection (OSI) reference model. These layers include the Physical (PHY) Layer, the Medium Access Control (MAC) Layer which is a sublayer of the Data Link (DL) Layer, the Network (NET) Layer, the Transport Layer, the Session Layer, the Presentation Layer, and the Application Layer. A Protocol Reference Model (PRM) defines the system architecture including its fundamental building blocks as to how they are organized in a system and how they interact with each other.

A PRM usually consists of a Data Plane and a Management Plane. The Data Plane typically includes the functionalities defined in the OSI model. The Management Plane ensures exchange of management messages between various layers, and between the layers and the Station Management Entity (SME). SME is generally the substrate or the platform on which the communications system resides. Sometimes a device or a system consisting of the PHY, MAC and NET layers may be a part of a network of similar systems and interfacing between these entities may be required for the management and control purposes. Hence, a Network Control and Management System (NCMS) can be introduced. Introduction of an NCMS allows the general device architecture and its PHY/MAC functionalities to be independent of the network architecture, the transport network, the protocols used at the backend, hence allowing for a greater flexibility. The PHY and MAC Layers may interact with each other directly or through a Service Access Point (SAP). An SAP is a location at which one layer of the stack can request services from the other layer.

Conventional PRMs describing communications systems do not effectively account for the fact that the spectrum availability can be dynamic and unevenly distributed, i.e., some portions of the spectrum (channels) can be occupied by users in an area while others can be available for transmission, and this availability can vary in time.

SUMMARY OF THE INVENTION

One embodiment of the present invention provides a cognitive communications system. The system includes a Data Plane including Physical (PHY) and Media Access Control (MAC) Layers operatively coupled to one another. The system further includes a Management Plane having a Management Information Base (MIB) for interfacing with each of the MAC and PHY Layers and storing primitives used to configure the system, and one or more modules for interfacing the MIB to at least one of a Station Management Entity (SME) and a Network Control and Management System (NCMS) for controlling operation of the system. The system further includes a Cognitive Plane having at least one of a Spectrum Manager (SM), a Spectrum Sensing Function (SSF), and a Geolocation (GL) Function for interfacing with the MIB and determining whether additional resources including a spectrum are available to enable communication. Each of the planes is distinct from one another.

In one such embodiment, the Cognitive Plane includes each of the Spectrum Sensing Function (SSF), Geolocation (GL) function, and the Spectrum Manager (SM). In one such case, the SSF is for detecting signals in a given channel and the GL function is for providing geolocation information, and the SM determines whether to transmit information on the given channel based on sensing information received from the SSF and geolocation information received from the GL function. The SM may be further configured as a Signal Space Manager (SSM) capable of managing signal space of system in the context of at least one of space, time, frequency, spectrum, modulation, coding, power, and location. The SSF may be further capable of at least one of clustering of the sensing information and signal classification.

The system may include various service access points (SAPs), such as an SM-SSF SAP for operatively coupling the SM to the SSF function, and an SM-GL SAP for operatively coupling the SM to the GL function. In another particular such embodiment, the Cognitive Plane further includes one or more Security Sublayers between the SM and the SSF, one or more Security Sublayers between the SM and the GL function, and/or one or more Security Sublayers between the SM and the Management Plane. The one or more Security Sublayers included in the system may be used, for example, for authentication of detected signals, authentication of geolocation information, tamper-proofing SM functionality, authentication of system co-existence information, detection and reporting of spurious transmissions, and/or protection of sensitive information relevant to spectrum availability and/or usage. Likewise, the one or more Security Sublayers may be used, for example, scheduling random cognitive communications device sensing to distinguish between a legitimate or malicious activity, scheduling co-operative sensing via a collection of nodes to distinguish between legitimate and malicious activity, and/or finger printing of detected signals.

The system may include a Convergence Sublayer operatively coupled to the MAC Layer and for converting data to/from a format compatible with the MAC Layer and communicating with higher layers operatively coupled to the system. In another particular case, the Data Plane further includes one or more Security Sublayers for securing communication between the MAC Layer and the PHY Layer. In another particular case, the one or more modules for interfacing the MIB include a Management SAP for exchanging time-insensitive configuration information between the MIB and the at least one of the SME or the NCMS, and a Control SAP used for exchanging time-sensitive information between the MIB and the at least one of the SME or the NCMS. In another particular case, values inside the MIB are at least one of pre-defined values, values that are populated during system initialization, and values that are populated during system operation.

In another particular case, the Cognitive Plane further includes a Policy Engine for defining system and network policies, and a Learning and Reasoning Module for keeping track of at least one of signal behavior, user behavior, system behavior, friendly operators, and malicious operators. In some embodiments, at least one of the Learning and Reasoning Module, Policy Engine, Spectrum Manager (SM), Spectrum Sensing Function (SSF), and Geolocation (GL) function are implemented as separate modules on a network of the system. The Cognitive Plane may include a Security Sublayer for securing communication between the SM and the MIB.

In another particular case, the system includes at least one cognitive node and at least one non-cognitive node and is associated with a communication frame structure, and cognitive and non-cognitive nodes exchange information using self co-existence windows of the frame structure, whereby cognitive nodes transmit information related to at least one of the resources, the system, and network policies, and whereby non-cognitive nodes receive information related to at least one of the resources, the system, and network policies. In another particular case, the system includes at least one cognitive mesh-enabled node and at least one non-cognitive non-mesh-enabled node and is associated with a communication frame structure, and cognitive mesh-enabled and non-cognitive non-mesh-enabled nodes exchange information using mesh control zones of the frame structure, whereby cognitive nodes transmit information related to at least one of the resources, the system, and network policies, and whereby non-cognitive nodes receive information related to at least one of the resources, the system, and network policies. In another particular case, the system is associated with a communication frame structure and at least one of mesh control zones and self co-existence windows of the frame structure are used for backhaul link formations between cells.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
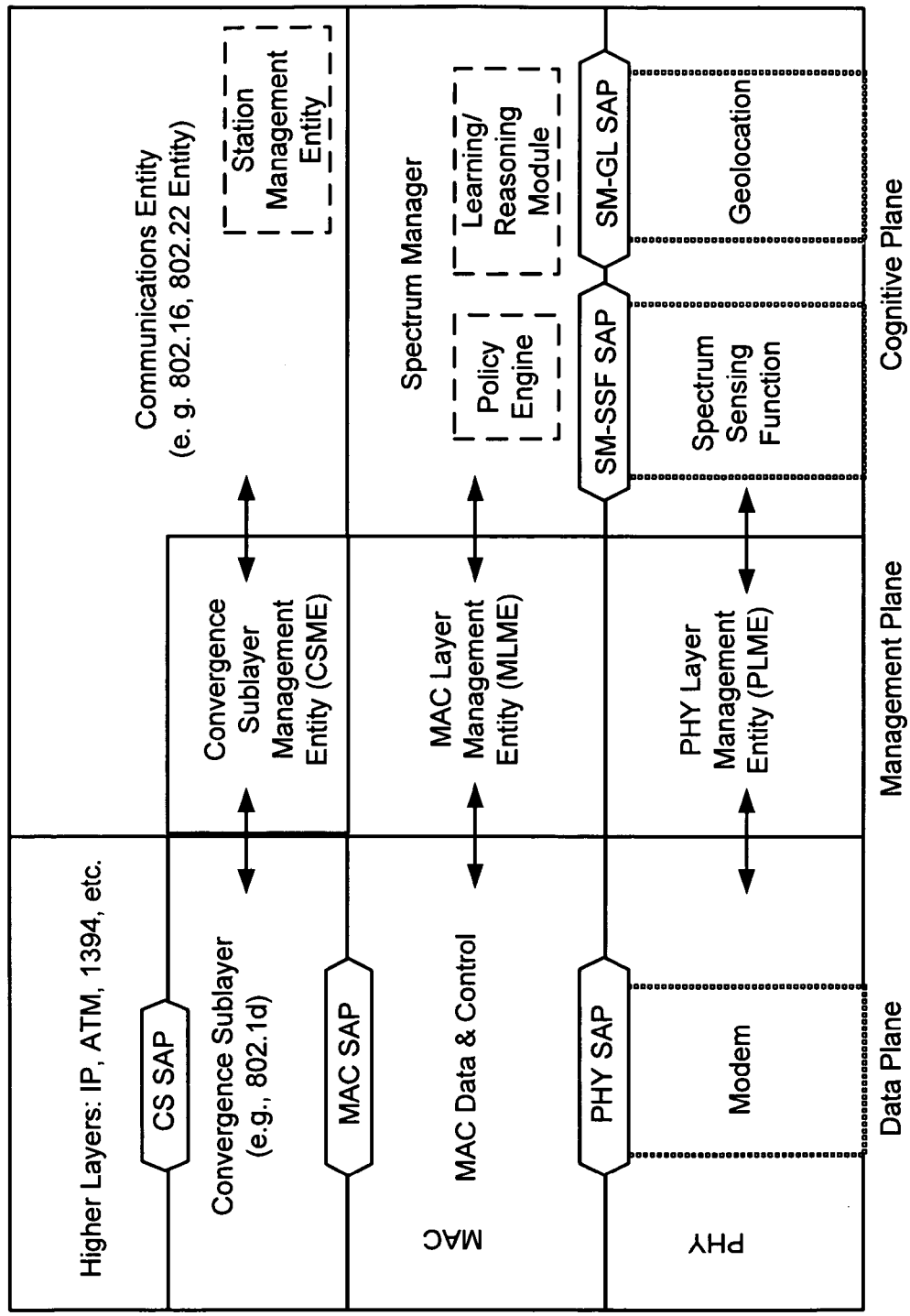
FIG. 1 illustrates the Protocol Reference Model (PRM) of a cognitive communications system, configured in accordance with an embodiment of the present invention.

Cognitive communications systems and their corresponding Protocol Reference Models (PRMs) are disclosed. Techniques are provided by which various components of cognitive and non-cognitive, as well as mesh-enabled and non-mesh-enabled nodes in a network, inter-operate with each other. A communications system as described herein may follow a client-server architecture. A Server may refer to, for example, a Base Station (BS) or a Control Node (CN) or a Mesh Node (MN-S) acting as a Server. The Client may refer to a Subscriber Station (SS), a Mobile Station (MS), a Customer Premises Equipment (CPE), a Mesh Node (MN-C) acting as a Client or any equipment that is used as a communications platform with the rest of a network.

General Overview

A unique characteristic of a communications system as described herein is its cognitive capability. In particular, a cognitive communications system as described herein is capable of accounting for the fact that the availability of resources (e.g., spectrum) can be dynamic and unevenly distributed (e.g., some portions of the spectrum or channels can be occupied by users in an area while others can be available for transmission), and this availability can vary in time. In general, a cognitive radio configured in accordance with an embodiment of the present invention is aware of its environment and is capable of configuring itself to make optimum usage of the available resources (e.g., spectrum) to meet user needs. For instance, some example system architectures provided herein define an air interface that is frequency agile and can adjust to the disjoint and dynamic spectrum availability while avoiding interference to existing users. In any such cases, a cognitive radio system architecture may be defined such that it can keep track of multiple channels or spectrum allocations to know which of these channels are occupied by other users and which are unused in a particular geographical area. The radio may then configure itself to use the available channel or channels, thus enabling dynamic frequency selection or dynamic channel access, hence improving the system efficiency.

As previously explained, a Protocol Reference Model (PRM) defines the architecture of a communications system, and includes the system's fundamental building blocks as well as how they are organized into a working communications system and how they interact with each other. A conventional PRM typically includes a Data Plane and a Management Plane. Unfortunately, such conventional PRMs describing communications systems do not define a cognitive communications system. Thus, and in accordance with an embodiment of the present invention, a PRM for a cognitive communications system is provided that incorporates a Cognitive Plane in addition to the Data and Management Planes.

In more detail, a cognitive communications system, in addition to conventional features associated with Data and Management Planes, includes a Cognitive Plane that contains or otherwise supports cognitive radio capabilities. These functions, components, sensors, and interfaces sense the medium such as the wireless spectrum for the presence of various signals, authenticate the detected signals, obtain the location of the device, interface with a database which may be present on a network, make a decision whether to transmit information in a particular channel or spectrum, act as a secondary user, define and modify the system policies, and learn from the sensed information. In conventional PRMs, there is no provision for such additional functionality that might be associated with cognitive communications systems. Nor do conventional PRMs specify or distinguish between the Data, Management, and Cognitive Planes. Further, conventional PRMs do not ensure or otherwise provide any adequate security mechanisms suitable for a cognitive communications system. The Data Plane functions are enhanced due to the additional awareness from the Cognitive Plane.

The Data Plane includes the Physical (PHY) Layer, the Medium Access Control (MAC) Layer, and the Convergence Sublayer (CS), plus any of the upper layers such as the Network (NET) Layer and Applications (APP) Layer. Service Access Points (SAPs) can be added in between these layers allowing modularization of the system, where different components may be disjoint and/or from different vendors. An SAP is provided with a well-defined interface or primitives to exchange the information, by virtue of which these different components can talk to each other. The Management Plane includes various management entities, such as the PHY Layer Management Entity (PLME), the MAC Layer Management Entity (MLME), and the Convergence Sublayer Management Entity (CSME). These management entities contain the primitives which are used for system/device configuration. The Management Plane ensures exchange of management messages between various layers, and between the layers and the Communications Entity (CE). A Station Management Entity (SME) is a part of the CE. The CE is generally the substrate or the platform on which the cognitive communications system resides, which may be a Base Station (BS) or the Customer Premises Equipment (CPE) of a system such as a wireless IEEE 802.22 system. The SME helps in device configuration by providing the drivers and interfaces for the same. In some embodiments of the present invention, the management layer functions, such as the CSME, MLME, and PLME, may be replaced by a database of primitives and information elements. This database may be implemented as the Management Information Base (MIB). A MIB is a database where all the system configuration information is temporarily or permanently stored and can be accessed by various specified functions such as the MAC and PHY Layers (or other blocks of the communication system).

In one example embodiment, the Cognitive Plane has features and components which include a Spectrum Sensing Function (SSF), a Geo-location (GL) function, a Spectrum Manager/Spectrum Automaton (SM/SA) and various optional dedicated security sublayers. The SSF implements spectrum sensing algorithms and the GL module is used to determine the location of the communications entity (e.g. IEEE 802.16, 802.22, and other such entities). The SM effectively operates as a controller that maintains spectrum availability information gathered by sensing. Based on this combined information and on predefined sharing rules, the SM provides the configuration information to its MAC which sends out this information to the users over the air. Other functions of the SM may include maintaining the spectrum usage tables of its neighboring cells, detecting interference on a channel from its own sensor or from the sensors of its CPEs, performing tasks that support the security of the system to protect against malicious operations, and deciding to either switch to an alternate channel or to go into the co-existence mode. The co-existence mode in a cognitive system includes mechanisms for interference free scheduling, dynamic resource renting and offering, and adaptive on-demand channel contention, and allows for co-existence and sharing of resources. A corresponding spectrum management entity at the CPE is referred to herein as a Spectrum Automaton (SA) signifying reduced authority, awareness and complexity as compared to an SM. An SA operates as a slave to the SM at the BS. The SA may perform tasks which do not require decision making or enhanced cognition, such as scheduling periodic sensing to gather the knowledge of the surrounding environment and reporting it to the SM at the BS. The SA may have its own internal timers prescribed as a directive from SM to perform these periodic functions of sensing. However, the SA does not have the authority to make transmission decisions. An SA may also ask its SSF to perform periodic sensing functions. A Signal Space Manager (SSM) is a Spectrum Manager that manages not just the spectrum, but the signal space. For example, and in one particular embodiment, the SSM may be configured to manage the signal space including space, time, frequency or spectrum, modulation, coding, power and location. In some embodiments, an SSM includes a Policy Engine (PE), which may be configured to implement all the functions of an SSM and further defines the system and network policies. An SSM may also contain a Learning and Reasoning Module (LRM) implemented with various machine learning algorithms that help in keeping track of the behavior of signals, users, systems and the network of the friends as well as malicious operators.

The example PRMs and architectures disclosed herein provide for the separation of Data, Management, and Cognitive Planes. Such distinctions are particularly beneficial in a network of communications devices, where not all the devices are enabled with the Cognitive Plane functions. These devices will contain Data planes only and receive information on signal space (spectrum) access from the devices that are enabled with the Cognitive Plane functions. On the other hand, there may be devices which are enabled with the Cognitive Plane functions only, and their task will be to perform functions such as spectrum sensing and geolocation, and to pass that information into the network through entities such as a Network Control and Management System (NCMS). An NCMS allows the specified PHY/MAC Layers to be independent of the network architecture, the transport network, and the protocols used at the backend, hence allowing greater flexibility. In accordance with some embodiments, the NCMS logically exists at the BS and CPE/MS/SS side of the radio interface, termed NCMS (BS) and NCMS (CPE/MS/SS), respectively.

In addition to these layers and interfaces, a cognitive communications system configured in accordance with an embodiment of the present invention may further include various interfaces and SAPs. SAPs are the optional gateways or interfaces which when included, facilitate system implementation and information exchange. SAPs define the input and output primitives or the parameters which are used for exchange between various layers. For example, SAPs can be implemented between the Spectrum Manager and the Spectrum Sensing Function (e.g., SM-SSF SAP), and between the Spectrum Manager and the Geolocation function (e.g., SM-GL SAP). In addition, a MAC-SM or MLME-SM SAP and a PHY-SSF or a PHY-PLME SAP may be introduced. On the Management Plane, various other SAPs may include, for example, an NCMS-MLME SAP, an NCMS-PLME SAP, an MLME-PLME SAP, an NCMS-CSME SAP, and a CSME-MLME SAP. Hence, example SAPs to interact with the SME may be defined as SME-MLME SAP and SME-PLME SAP. The SAPs that interface between an MIB and the NCMS may be simplified to a Management SAP (M-SAP) and a Control SAP (C-SAP). Absence of SAPs, however, does not mean that two neighboring modules cannot exchange information. It just means that a formal interface is not defined.

A cognitive communications system or a node configured in accordance with an embodiment of the present invention may employ these various interfaces and arrangements of various functionalities to be carried out and paths, to ensure that the PHY/MAC and the NET Layers can exchange valuable information collected from the Spectrum Sensing Function. The Spectrum Sensing Function, Geolocation function, PHY and MAC Layers, and other network layers send information to the Spectrum Manager, which in turn makes a decision on whether to transmit information bearing signals in a given spectrum or not. As will be apparent in light of this disclosure, interfacing of PHY, MAC and NET Layers to a Spectrum Manager is not a trivial task. As previously explained, conventional PRMs do not specify a Cognitive Plane or otherwise distinguish between the Data, Management, and Cognitive Planes. Making these distinctions as described herein modularizes the system, where each module has a dedicated task. Such provisioning of and distinguishing between the planes in accordance with various embodiments allows modules from different vendors to be interfaced so as to create a cognitive communication system, which otherwise would not be possible without proper interfaces that are defined using SAPs. In addition, by providing distinct Cognitive, Data, and Management Planes, specific security features such as availability, encryption, authentication, integrity, privacy, and other such features may be provided for any of these planes to ensure the safety of such a system. Having security mechanisms at each interface facilitates the ability to partition the modules from each other so that they may be separately developed System Architecture FIG. 1 illustrates the Protocol Reference Model (PRM) of a cognitive communications system, configured in accordance with an embodiment of the present invention. As previously explained, a communications system as described herein may follow a client-server architecture. In general, a server may be referred to herein as a BS and the Client as an SS. Further note that the terms SS, CPE, MS, MN-C may be used interchangeably with respect to this disclosure. Similarly, the terms BS, CN, MN-S may be used interchangeably.

As can be seen, the system has distinct Cognitive, Data, and Management Planes. The Data Plane includes a PHY Layer and modem (and any other PHY Layer componentry, such as RF modules and antennas), a PHY SAP, a MAC Data and Control Layer, a MAC SAP, a Convergence Sublayer and a Convergence Sublayer SAP (CS SAP), along with various Higher Layers. The Management Plane includes a PHY Layer Management Entity (PLME), a MAC Layer Management Entity (MLME), a Convergence Sublayer Management Entity (CSME), and a Station Management Entity (SME) residing on a Communications Entity (CE). The Cognitive Plane includes a Spectrum Manager (SM) that includes a Policy Engine (PE) and a Learning and Reasoning Module (LRM), a Spectrum Sensing Function (SSF), a Geolocation (GL) function, an SM-SSF SAP, and an SM-GL SAP. Each of the GL function and the SSF function may also include or otherwise be operatively coupled to an RF module and antenna, as will be apparent in light of this disclosure.

In this example embodiment, the Data Plane includes the PHY Layer connected directly to the MAC Common Part Sublayer via the PHY SAP, and the MAC Common Part Sublayer is connected to the Convergence Sublayer via the MAC SAP. The Convergence Sublayer is connected to the Higher Layers, such as the NET Layer and the backhaul, through the CS SAP.

As will be discussed in turn, the Cognitive Plane may include a Signal Space Manager (SSM) in place of a Spectrum Manager (SM), and a Signal Detector (SD) function in place of the Spectrum Sensing Function (SSF), as well as corresponding changes to, or omission of, various SAPs. The SM (or SSM) functional block provides management and control functions for the dynamic spectrum access. The SM interfaces to the SSF and GL functional blocks. The interfaces between the SM and the SSF and GL blocks are formalized via the SM-SSF SAP and the SM-GL SAP, respectively, to enable the multi-vendors plug-and-play and interoperation capabilities.

Information may be exchanged between PLME and PHY Layer. Similarly, the PLME and the Spectrum Sensing Function and/or Geolocation Function can exchange information. Information may also be exchanged between the MLME and the MAC Layer as well as the MLME and the SM. Information may also be exchanged between the CSME and the Convergence Sublayer as well as the CSME and the Communications Entity and/or SME. Any of these information exchanges can be well-defined using SAPs, if so desired. For example, the PRM architecture of the example embodiment shown in FIG. 1 may specify a MAC-SM SAP to formalize information exchange between the MAC and the SM, thereby enabling greater flexibility in multi-vendor plug-and-play interoperation. There may also be a formalized interface connecting the SSF functional block to the PLME (e.g., PLME-SSF SAP). On the other hand, and in some alternative embodiments, the SSF block may be architected as an integral function within the PHY Layer, thereby eliminating any need for a PLME-SSF SAP. Similar integrations can be used to eliminate other SAPs, as will be apparent in light of this disclosure. However, such integrated architecture design may not allow for the multi-vendor development of the PHY and the SSF functionalities. Other embodiments may use only a simplified signal detector (an SSF with no intelligence). In addition, various optional Security Sublayers may be used as will be discussed in turn. Each of the functional blocks or layers shown in FIG. 1 are now discussed in turn.

SAP: A Service Access Point is an interface and conceptual location at which one OSI layer can request the services of another OSI Layer. Presence of an SAP allows for modularization of the system, where different components may be disjoint and/or from different vendors, but an SAP is provided with a well-defined interface or primitives to exchange the information called, by virtue of which these different components can talk to each other. Absence of an SAP does not mean that the two neighboring modules cannot exchange information between them. It simply indicates that a formal interface has not been defined. The SAPs shown in FIG. 1, including the MAC SAP, PHY SAP, CS SAP, SM-SSF SAP, and the SM-GL SAP, can be implemented using conventional techniques, or can be replaced with other conventional interface techniques for inter-module communication.

PHY Layer: The Physical Layer directly interacts with the physical medium such as air, ether, water, wire, cable, etc. The PHY Layer generally includes the hardware, firmware and/or software which generate waveforms that are transmitted to and received from the medium. The PHY Layer is also responsible for interacting with upper layers such as the MAC Layer to transfer and encapsulate information to and from those upper layers. The PHY Layer can be implemented with conventional technology as typically done, and will depend on particulars of the communication medium, whether wired or wireless. In one example embodiment, the communications device is a wireless communications device, and the PHY Layer interfaces to the medium using an RF module and one or more antennas.

MAC Layer: The Medium Access Control Layer, which can also be implemented as conventionally done, provides addressing and channel access control mechanisms that make it possible for several terminals or network nodes to communicate within a multipoint network, such as a local area network (LAN) such as IEEE 802.11, or a metropolitan area network (MAN) such as IEEE 802.16, or a Regional Area Network (RAN) such as IEEE 802.22, or other such wide area networks (e.g., Internet, Cellular Mobile Systems such as GSM, GPRS, WCDMA, IMT-2000, 3G, etc). The MAC Layer interfaces to the PHY Layer via the PHY SAP. The MAC layer addressing mechanism includes a physical address or MAC address associated with each network adaptor, so that each adaptor is assigned a unique serial number. Thus, it is possible to deliver data packets to a specific physical destination within a network having one or more interconnected sub-networks (e.g., by way of switches, hubs, repeaters, and bridges). As is known, channel access control mechanisms provided by the MAC Layer (multiple access protocol) make it possible for several stations connected to the same physical medium to share it. The shared physical media can be implemented with any number of wireless and/or wired network topologies, and may further employ collision detection/avoidance techniques for contention-based channel access systems (e.g. packetized channels), or selective establishment of logical channels for circuit-switched, channelization-based channel access systems, or dynamic resource allocation and dynamic channel allocation.

Figure 3:
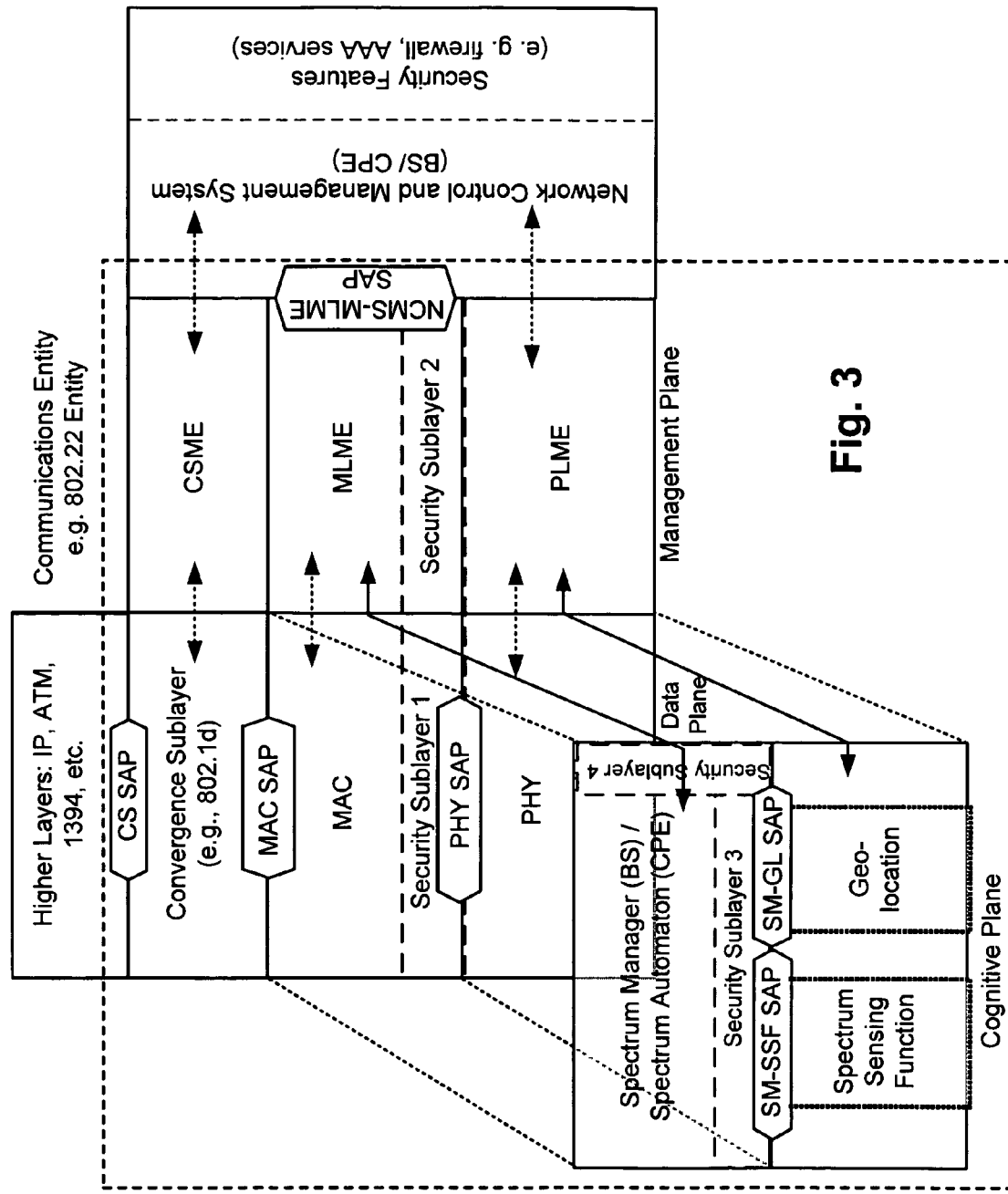
FIG. 3 illustrates the PRM of a cognitive communications system, configured in accordance with another embodiment of the present invention.
Figure 4:
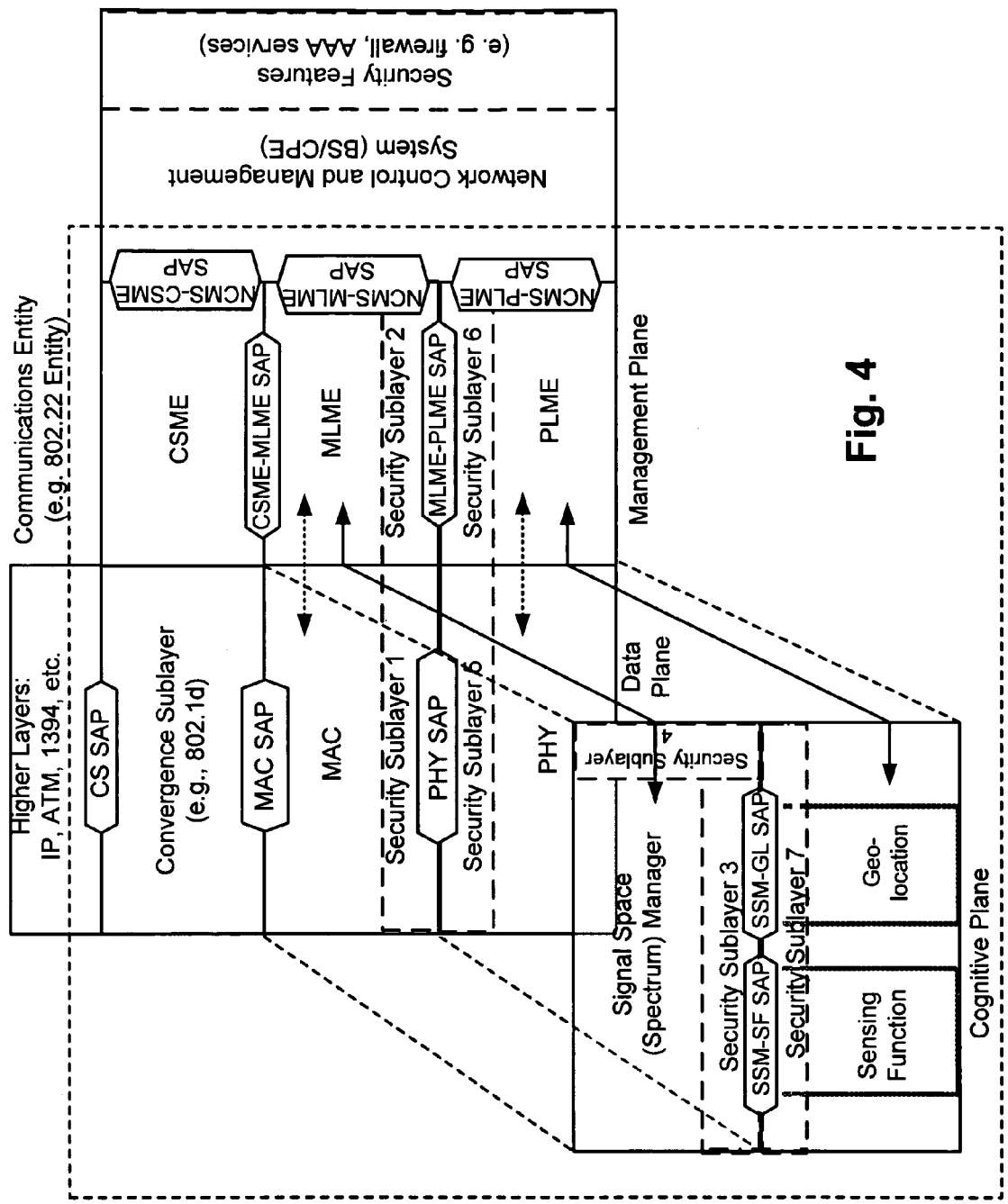
FIG. 4 illustrates the PRM of a cognitive communications system, configured in accordance with another embodiment of the present invention.
Figure 5:
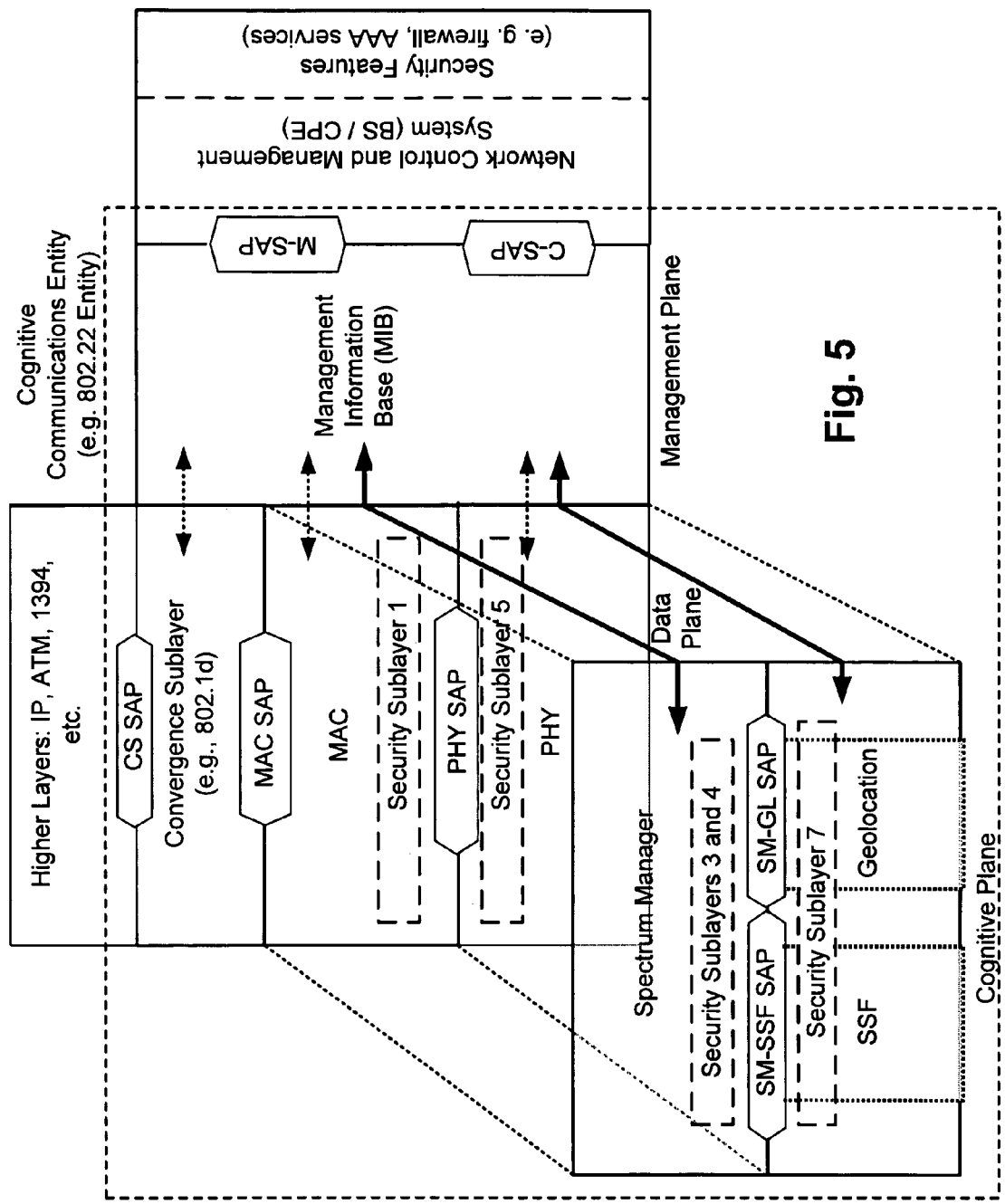
FIG. 5 illustrates the PRM of a cognitive communications system, configured in accordance with another embodiment of the present invention.

SSL: A Security Sublayer can be used to provide subscribers and various users of the communication system with security features such as authentication and availability, privacy, confidentiality, integrity, and non-repudiation across the network. The label of Security Sublayer is somewhat of a misnomer since in reality, a Security Sublayer effectively provides security functions to the entire system. However, its presence at a particular level in the OSI stack represents whether that particular set of security features is provided to the raw signals, or bits of information, or to a network. In one example embodiment, this is achieved by applying cryptographic transforms to data carried across between connections between communications devices. In addition, a Security Sublayer can be used to provide network operators with strong protection from theft of service. In particular, and in accordance with an embodiment, the communications system protects against unauthorized access to data transport services by enforcing one or more encryption schemes of the associated service flows across the network. In one such example embodiment, a Security Sublayer employs an authenticated client/server key management protocol in which the server controls distribution of keying material to client. Additionally, transport connection security mechanisms can be strengthened, for example, by adding digital-certificate-based client device-authentication to the key management protocol. Numerous suitable security schemes can be employed at various Security Sublayers, as will be apparent in light of this disclosure. Although no Security Sublayers are provided in the example embodiment shown in FIG. 1, other embodiments shown in FIGS. 3, 4, and 5 are configured with various Security Sublayers, which will be discussed in turn.

SSL in the Cognitive Plane: Cognitive nodes and networks contain separate gateways to access the communications medium through the SSF and GL functions. Additionally, the SM makes a decision on whether to transmit information in the spectrum or not, and that decision is then conveyed to the MAC Layer which acts upon this information. As a result, security in cognitive nodes and networks may use enhanced features in order to protect the system and its components from malicious devices and operators. Example security features for the Cognitive Plane may include, for instance, checking for the authentication of the detected signals, checking for the authentication of the geolocation information, making the SM functionality tamper proof, authentication of the system co-existence information, detection and reporting spurious transmissions, protection of the sensitive information relevant to spectrum availability and/or usage, scheduling random cognitive communications device sensing to distinguish between a real signal or a malicious attack (distinguishing between legitimate and malicious activity), scheduling co-operative sensing via a collection of nodes (e.g., such as CPEs, MSs, or SSs) to distinguish between an authentic signal or a malicious attack (distinguishing between legitimate and malicious activity). Although no SSLs are provided in Cognitive Plane in the example embodiment shown in FIG. 1, other embodiments shown in FIGS. 3, 4, and 5 each have a Cognitive Plane configured with various Security Sublayers, which will be discussed in turn.

CS: Generally, the Convergence Sublayer resides on top of the MAC Layer and converts data to/from a format compatible with the MAC Layer. For instance, the Data Plane functions from Higher Layers such as IP, ATM, and 1394, and the MAC Layer may communicate via the Convergence Sublayer. A packet Convergence Sublayer is a version of a Convergence Sublayer oriented toward Ethernet or Internet Protocol (IP) traffic. Between the MAC Layer and the Convergence Sublayer, a MAC SAP is used to formalize the information exchange to and from the MAC Layer. Additionally, a Convergence Sublayer SAP is used to interface between Convergence Sublayer and the Higher Layers. In typical applications, the Convergence Sublayer performs the following example functions, utilizing the services of the MAC Layer: receiving packet data units from the Higher Layers; classifying the higher-layer packets into the appropriate connection; delivering the resulting Convergence Sublayer packet data units to the MAC SAP associated with the service flow for transport to the peer MAC SAP; and receiving the Convergence Sublayer packet data units from the peer MAC SAP. In this example embodiment, the Convergence Sublayer is implementing the 802.1d standard, but other such standards and communication protocols can be used, depending on the given application. The Convergence Sublayer can be implemented with conventional technology as typically done.

CE: A Communications Entity is an entity of the substrate on which the cognitive communication system resides. This may be implemented with any combination of a hardware, software and/or firmware. A CE interfaces with most of the blocks shown in FIG. 1, directly or through SAPs. The RF stage and the medium access components such as antennas may or may not be included as a part of the CE. This is because, it is possible to utilize the same RF and antenna blocks for the purpose of sensing, geolocation as well as data transmission. However, dedicated RF and antenna blocks can be used for each function, if so desired.

SME: In the example embodiment shown, an optional Station Management Entity resides in the CE. In general, the SME controls the system configuration and it controls the operation of the device to an extent defined by the applicable specifications. In addition, an SME is responsible for functions such as the gathering of layer-dependent status from the various layer management entities and setting the value of layer-specific parameters. An SME typically performs such functions on behalf of general system management entities and may implement standard management protocols. An SME may be implemented with any combination of a hardware, software and/or firmware. An SME interfaces with most of the blocks shown in FIG. 1, directly or through SAPs. In other embodiments, the functionality of the SME may be integrated into the CE. Still other embodiments may have the management functionality replaced by an MIB as will be discussed in turn.

NCMS: As the communication devices implementing PRMs disclosed herein (such as the one shown in FIG. 1) may be part of a larger network, they may be further configured for interfacing with entities for management and control purposes. In such cases, and as shown in FIGS. 2-5, a Network Control and Management System (NCMS) abstraction may be introduced including these entities. The NCMS abstraction allows the specified PHY and MAC layers to be independent of the network architecture, the transport network, and the protocols used at the backend, therefore allowing greater flexibility. In some embodiments, the NCMS logically exists at the Base Station (BS) and Customer Premises Equipment (CPE) side of the radio interface, and is termed NCMS (BS) and NCMS (CPE), respectively. Any necessary inter-BS coordination can be handled through the NCMS (BS). The NCMS allows remote management of a CPE or other entity, such as a Subscriber Station (SS) or Mobile Station (MS) by the exchange of certain configuration parameters through an MIB. The NCMS may have an authenticator to ensure, authentication, authorization and accounting (AAA) of any configuration information coming into the cognitive radio and its MIBs. The NCMS can be implemented with conventional technology as typically done.

MIB: Although not shown in FIG. 1, some embodiments (such as the one shown in FIG. 5), replace the various Management Plane functions with a database of primitives and the values contained in them. This database can be implemented, for example, as a Management Information Base (MIB). In general, an MIB can be used to store the elements which are used to configure a communications device, or to pass-on sensed/collected parameters to various entities, such as an Internet Service Provider (ISP) or a Base Station (BS). MIBs make the system modular and well-defined, and allow for relatively easy remote management. These MIB functions can be configured, for example, locally using a Station Management Entity (SME) which may reside in a Communications Entity (CE) or remotely through a Network Control and Management System (NCMS). In one particular embodiment, the MIB is a database of the configuration parameters that are used to configure the hardware, software and/or firmware that constitutes the device or a system. These MIB parameters may be obtained, for example, from the network, or they may be pre-defined within the system, or they may be obtained from another device after an exchange of information over the communication medium. In some embodiments, the MIB is a passive database or collection of information organized hierarchically, and is implemented in hardware, software, and/or firmware. The MIB may be comprised, for example, of managed objects and are identified by object identifiers. MIBs can be accessed, for example, using a network-management protocol such as SNMP. A managed object is one of any number of specific characteristics of a managed device. Managed objects are comprised of one or more object instances, which are essentially variables. A Managed object may also be referred to as an MIB object, an object, or an MIB. A managed node is a node that collects and stores managed objects in the format of the MIB. The node can be made available to the network management system, for example, via management protocols, such as Simple Network Management Protocol (SNMP). A managed CPE is one kind of managed node that supports management connection, and an unmanaged CPE is a CPE that does not support management connection.

PLME: The PHY Layer Management Entity provides efficient management of the physical resources of the system, and may further provide an interface between the SME or NCMS and the PHY Layer, allowing the SME or NCMS to modify the PHY Layer configuration as needed. In addition to such typical functionality, the PLME may be further configured to interface with the SSF and/or GL function of the Cognitive Plane (e.g., using an SAP or other suitable interface technology). The PLME may also engage in security-based functions for a communications system, by performing tasks such as authentication and finger printing.

MLME: The MAC Layer Management Entity, which is a function block on the Management Plane where the PHY Layer MAC state machines reside, provides a traditional MAC management control function. For the various PRM architectures illustrated herein, there may or may not be any formal SAP interface between the MAC Layer and the MLME functional blocks. Examples of states an MLME may assist in reaching include: Authenticate, De-authenticate, Associate, Disassociate, Re-associate, Beacon, and Probe. In addition, the MLME may be further configured to interface with the SM of the Cognitive Plane (e.g., using an SAP or other suitable interface technology).

CSME: The Convergence Sublayer Management Entity provides a traditional Convergence Sublayer management control function, and may further provide an interface between the SME or NCMS and the Convergence Sublayer, allowing the SME or NCMS to modify the Convergence Sublayer configuration as needed. The CSME may also engage in security-based functions for a communications system, by performing tasks such as authentication and finger printing.

SSF: A Spectrum Sensing Function, which may also be implemented as a Signal Detector (SD), resides at the same layer as the PHY Layer. An SSF carries out signal detection, spectrum sensing and/or clustering, in accordance with one particular embodiment of the present invention. It may or may not share the components, antennas, hardware, software or firmware with the PHY Layer; however, one of its functionalities is to interact with the physical medium and sense the on-going activity. An SSF may be a slave sensor and just sense any activity without trying to parse it further, or it may include greater intelligence and perform additional functions, such as clustering of the sensing information followed by signal classification to understand the detected signals. In some embodiments, the SSF is equipped with its own independent physical layer components, such as a Radio Frequency (RF) stage and antenna for a wireless communications system. Having its own independent components allows the SSF to monitor other channels while actual communications are happening at the same time. The SSF may detect any and all signals in a given spectrum or a channel, or it may be dedicated to find only particular signals of interest.

GL: The Geolocation Function resides at the same level as the PHY Layer, in accordance with one particular embodiment of the present invention, and it may or may not share the components, antennas, hardware, software or firmware from the PHY Layer. The basic functionality of the GL is to identify the current location of the communications system on which it resides and/or help locate other communications systems. The GL then reports this information to the Signal Space (Spectrum) Manager, which takes further action on this information as described herein. The GL information may be acquired, for example, using signals from satellites used for the Global Positioning System (GPS) or using some other signals originating from available terrestrial systems such as cell phone towers, etc. Just as with the SSF, the GL function may be equipped or otherwise operatively coupled with its own independent physical layer components, (RF stage and antenna) for a wireless communications system. Each of the GL function and the SSF can be implemented in hardware (e.g., gate-level logic or other suitable circuitry), software, or combination thereof (e.g., microcontroller configured with a number of embedded routines for carrying out the functionality described herein). In one particular embodiment, the SM compares the GL information of the device with the information about primary users contained in a GL database to make decisions on whether to utilize the resources such as the spectrum.

Figure 6:
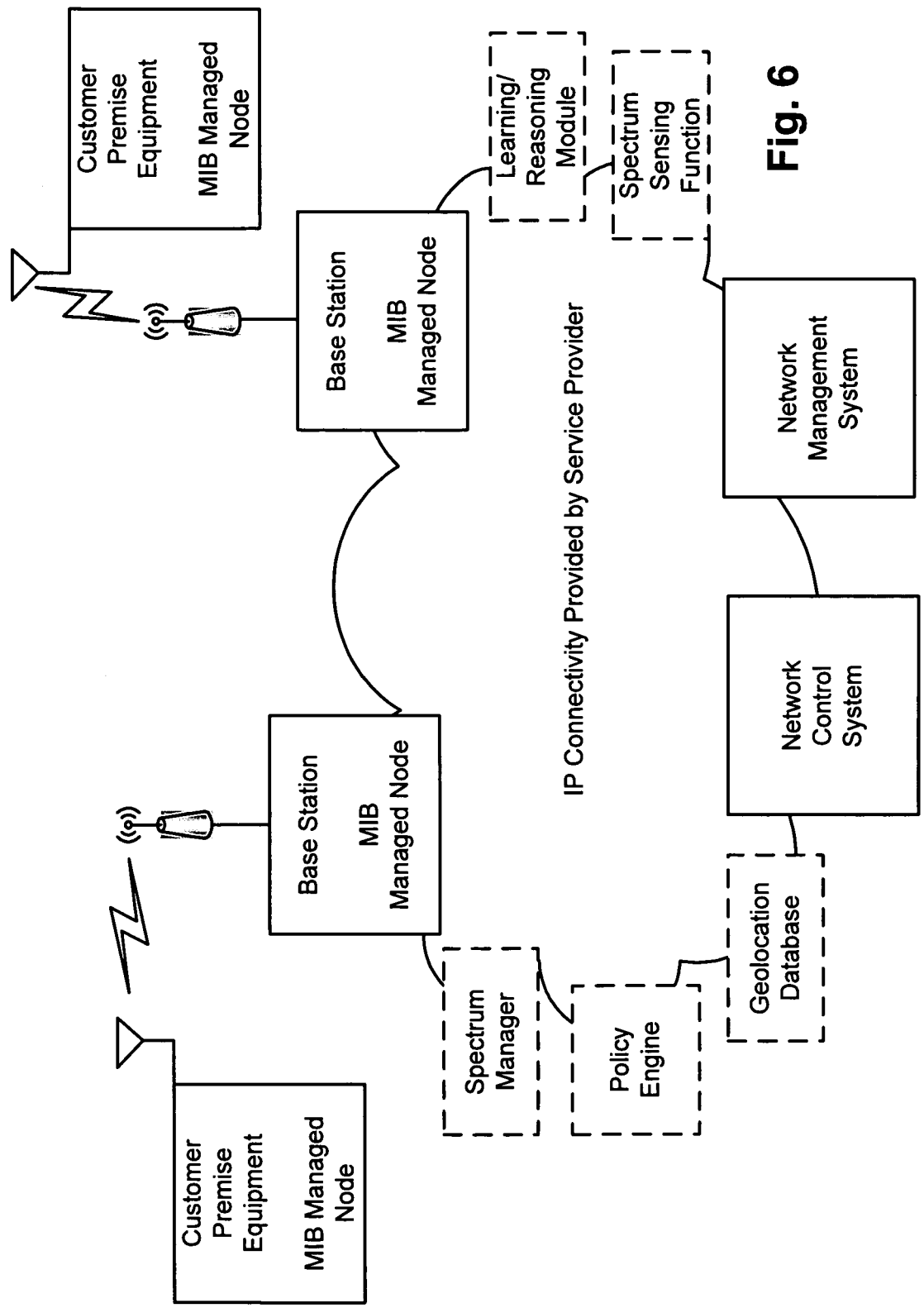
FIG. 6 illustrates the concept of the Network Control and Management System (NCMS) used for remote management of entities or devices, in accordance with an embodiment of the present invention.

SM/SA: The Spectrum Manager or a Spectrum Automaton can be thought of as a brain in the cognitive communications system. An SM that acts as a slave and does as directed or periodic scheduling functions but does not make any decisions is also called as an SA. In some embodiments, an SM may be centrally located as a Control Node or a Base Station. Alternatively, it may be distributed across many nodes in the communications system. In general, the SM obtains sensing information from the SSF and geolocation information from the GL. It then combines this information with other information such as a GL database, shown in FIG. 6, located on the network, and/or with information from other SMs and SAs in the network, and/or information coming from the system backhaul, and/or other useful information available to the SM, thereby allowing the SM to make informed decisions on whether to occupy/transmit on a particular channel or search for a new one. In the embodiment shown in FIG. 1, the SM obtain cues from a policy or rule database (Policy Engine, or PE) which may be country or signal dependent, or even application dependent. The SM may reside inside the MAC Layer, or in the Cognitive Plane at the same layer as the MAC in the Data Plane. Alternatively, an SM may reside in the SME or NCMS, somewhere in the network or even at some upper layer such as the Application Layer. An SM or SA may be implemented in hardware, software or a combination thereof. For the sake of simplicity, the term SM is used generically herein to facilitate description. However, note that an SM may have the capability of an SSM and/or a PE (other integrations of functionality described herein will be apparent in light of this disclosure). In addition, the SM in the example embodiment shown in FIG. 1 is configured with a Learning and Reasoning Module (LRM). The dotted lines indicate that the LRM and/or PE may be implemented, for example, as separate modules or their functionalities can be an integral part of the SM. In other embodiments, such as the one shown in FIG. 6, the LRM and/or PE may reside at some remote location and may exchange information over, for example, the Internet Protocol network through the NCMS. At the same time, as shown in FIG. 6, the system may be implemented such that the Spectrum Manager resides somewhere on the network and it communicates its decisions to the Communications Entity through the NCMS.

SSM: A Signal Space Manager is a Spectrum Manager that manages not just the spectrum, but the signal space. One such embodiment is shown in FIG. 4. In one particular such case, the SSM manages the signal space including space, time, frequency or spectrum, modulation, coding, power and location (or combinations thereof, or other such space and spectrum parameters). The SSM manages the space, for example, using techniques such as spatial multiplexing and beamforming. The SSM manages time, for instance, by using empty or partially filled spaces in the time domain. The SSM manages frequency or spectrum, for instance, using empty or partially filled spaces in the frequency domain. With respect to both the time and frequency domains, empty spaces may be termed as the white space and partially filled space may be termed as a gray space. The SSM manages coding using, for example, unused spreading codes to transmit more information in the space, and manages location using, for example, location information to transmit such that it does not interfere with signals being received at the neighboring location. The SSM manages the power, for example, by adjusting the gains of the transmit and receive amplifiers as well as Automatic Gain Control (AGC) circuits in the Data and Management Planes. In accordance with modulation, the SSM can manage the modulation schemes used by various cognitive communications devices for information exchange. In accordance with one particular embodiment, the SSM has the capability to classify the signal type based on the signal detection, feature extraction and clustering information. Additionally, the SSM may be capable of machine learning, and combining the signal classification and machine learning information to make policy-based decisions. An SSM may derive geolocation dependent policy information from upper layers such as the Network Layer. The policy-based decisions may be carried out, for example, based on game theoretic approaches and established heuristics.

PE: In some embodiments, such as the example shown in FIG. 1, an SM or an SSM may contain a Policy Engine (PE). In such cases, a PE may carryout all (or a subset thereof) the functions of SM or an SSM, and may further define the system and network policies. As previously explained, the PE may be implemented, for example, as a separate module or its functionality can be an integral part of the SM. Alternatively, the PE may reside at some remote location and may exchange information over the Internet Protocol network through the NCMS (or other suitable protocols, depending on the available communications network), as shown in FIG. 6.

LRM: As shown in the example embodiment of FIG. 1, a PE may be made intelligent through a Learning and Reasoning Module comprising, for example, machine learning algorithms which help in keeping track of the behavior of the signals, users, systems, and the network of friendly as well as malicious operators. Conventional learning and reasoning logic can be employed here. As previously explained, the LRM may be implemented, for example, as a separate module or its functionality can be an integral part of the SM. Alternatively, the LRM may reside at some remote location and may exchange information over the Internet Protocol network through the NCMS (or other suitable protocols, depending on the available communications network), as shown in FIG. 6.

In some embodiments having a network of communications devices, not all the devices will be enabled with the Cognitive Plane functions (e.g., only some of the devices in the network will have separate and distinct Data, Management, and Cognitive Planes, in accordance with embodiments of the present invention). In such cases, these non-cognitive devices will contain Data Planes only and may receive information on signal space (spectrum) access from the devices that are enabled with Cognitive Plane functions. On the other hand, there may be devices which are enabled with Cognitive Plane functions only, and their task is to perform functions such as spectrum sensing and geolocation, and then pass that information into the network through entities such as the NCMS. Numerous such configurations will be apparent.

Figure 2:
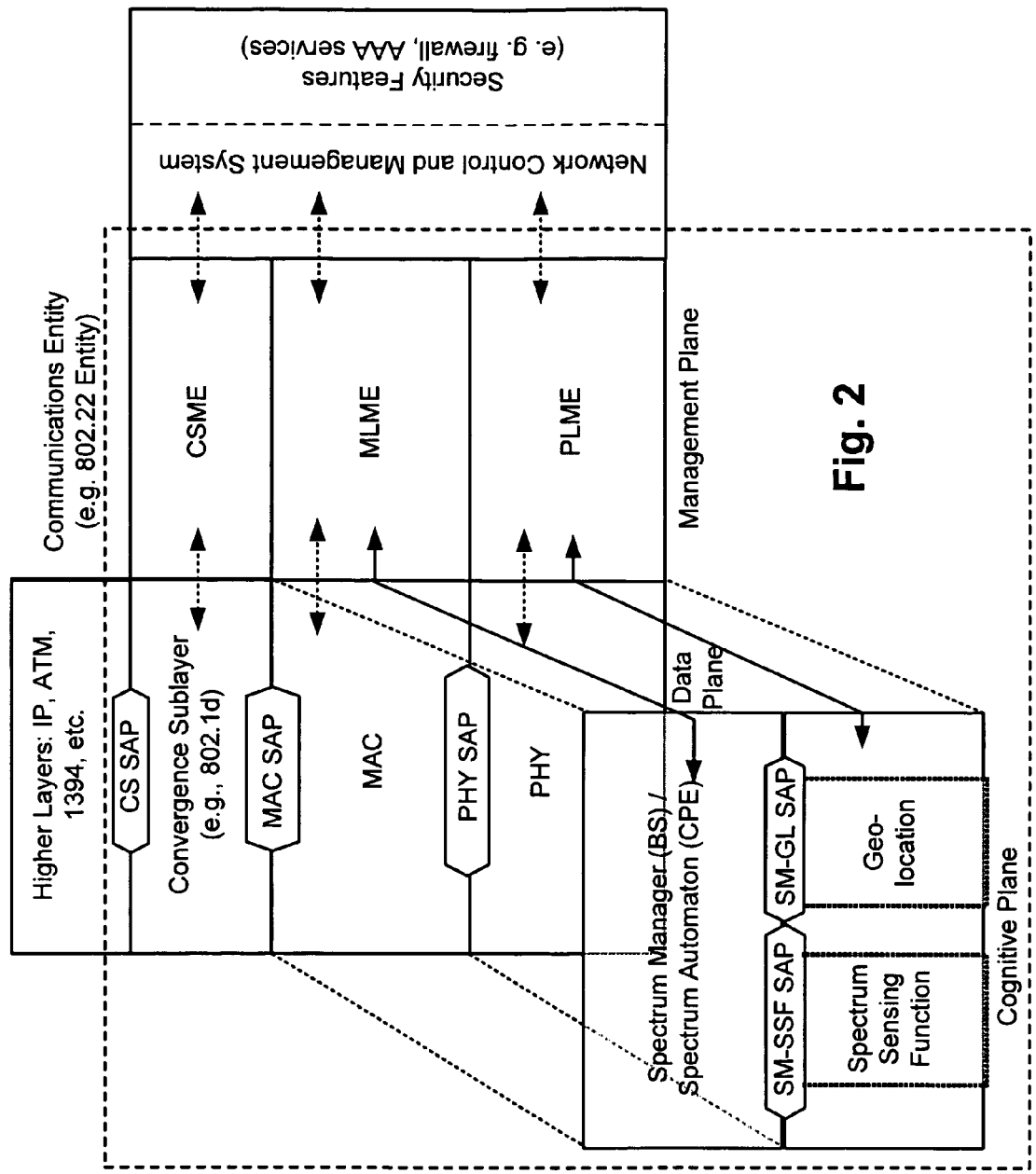
FIG. 2 illustrates the PRM of a cognitive communications system, configured in accordance with another embodiment of the present invention, such that the Cognitive Plane and its functions are implemented separately.

FIG. 2 illustrates a PRM architecture similar to that shown in FIG. 1, except that the Cognitive Plane functions are implemented in parallel to the Data Plane Functions and a Network Control and Management System (NCMS) has been added which interfaces with the Management Plane functions including the MLME, PLME and CSME. The previous discussion with reference to FIG. 1 is equally applicable here. In this example embodiment, the Management Plane functions are implemented in accordance with the IEEE 802.22 standard (other embodiments may be implemented in accordance with other suitable standards). The NCMS of this example embodiment is configured with a firewall and an authenticator to ensure, authentication, authorization and accounting (AAA) of any configuration information coming into the cognitive radio and its Management Plane. This architecture allows modular implementation of a cognitive communications device separating the cognitive components (SSF, GL and SM) from the non-cognitive functions such as PHY, MAC, CS, PLME, MLME, CSME, etc. This architecture also allows the addition of modular security features to both, the Cognitive Plane as well as the Data and Management Planes. Separation of cognitive and non-cognitive planes makes the system implementation easier and not all the communications devices need to be enabled by all the functions.

FIG. 3 illustrates a PRM architecture similar to that shown in FIG. 2, except that Security Sublayers 1, 2, 3, and 4 have been added to the PRM. In addition, a dedicated SAP is provided between the MLME and the NCMS (designated NCMS-MLME SAP in FIG. 3) for exchange of configuration information such as the information coming from a geolocation database in the network. Other interfaces between the NCMS and the PLME, as well as the NCMS and the CSME are provided but they are not defined through SAPs. The previous discussion with reference to FIGS. 1 and 2 is equally applicable here.

To enhance the security for the cognitive radio based access, Security Sublayers 3 and 4 are introduced in the Cognitive Plane, in addition to the Security Sublayers 1 and 2 in the Data and Management Planes, respectively. As will be appreciated in light of this disclosure, these Security Sublayers are optional and some or all of them may be removed if so desired.

Security Sublayers 1 and 2 provide protection for the Data Plane and Management Plane functions. These security functions include, for example, authentication of the device as well as the user, authorization to make use of the medium, as well as type of service that a user is allowed to utilize, key exchange functions, encryption of the information, utilization of specialized devices such as a Subscriber Identity Module (SIM) or a Smart Card, and embedded certificates as well as Extensible Authentication Protocols (EAP). The algorithms used to implement these security functions may include, for instance, Diffie Hellman key exchange algorithms, Elliptic Curve Cryptography Suites, Advanced Encryption Standard, Data Encryption Standard, Digital Signatures, and Digital Certificates.

Security Sublayer 3 performs functions such as scheduling random sensing periods to differentiate between a legitimate signal and a false/spoofed signal, scheduling collaborative sensing between various cognitive communications devices, authenticating the sensed signals including the geolocation information, and demodulating and decoding signals (e.g., specialized signals such as the beaconing signals) that have been detected to authenticate them. Security Sublayers 1 and 3 may also be used to authenticate the co-existence information received from the neighboring cells. Security Sublayer 4 authenticates any information that comes into the SM and provides protection for any information that goes out of the SM. Security Sublayer 4 also protects the SM from mis-configuration. In an alternative embodiment, the functions of Security Sublayer 4 can be moved to the NCMS.

FIG. 4 illustrates a PRM architecture similar to that shown in FIG. 3, except that Security Sublayers 5, 6 and 7 have been added, as well as dedicated SAPs in the form of NCMS-PLME SAP, NCMS-MLME SAP, NCMS-CSME SAP, CSME-MLME SAP and the MLME-PLME SAP. Each of the SAPs can be coded or otherwise configured using standard SAP techniques. The Security Sublayers 5, 6 and 7 provide security at the raw signal level.

To enhance the security for the cognitive radio based access, Security Sublayers 3, 4 and 7 are provided in the Cognitive Plane, in addition to the Security Sublayers 1, 2, 5, and 6 at the Data and Management Planes, respectively. These optional Security Sublayers provide enhanced protection to primary users (also referred to as the incumbents) as well as provide protection to the secondary users.

The functions used to implement the Security Sublayers may be coded (executable software) or otherwise configured (e.g., gate-level logic), for example, to provide spectrum and service availability, various forms of device, data and signal authentication, authorization, data, control and management message integrity, confidentiality, non-repudiation, and/or other such functions. Security Sublayers may also generally be referred to as security functions. The dotted lines around the various Security Sublayers indicate each such sublayer may be implemented, for example, as a separate module or its functionality may be an integral part of the layer at which it resides.

In more detail, and with reference to the embodiment shown in FIG. 4, Security Sublayers 1, 2, 5, and 6 provide protection for the Data and Management functions. These security functions may include, for example, authentication of the device as well as the user, authorization to make use of the medium, as well as type of service that a user is allowed to utilize, key exchange functions, encryption of the information, utilization of specialized devices such as the Subscriber Identity Module (SIM) or a Smart Card, and embedded certificates as well as Extensible Authentication Protocols (EAP). The algorithms used for these functions may include, for instance, Diffie Hellman key exchange algorithms, Elliptic Curve Cryptography Suites, Advanced Encryption Standard, Data Encryption Standard, Digital Signatures, Digital Certificates, and other suitable security algorithms. Security Sublayer 3 may perform function, for example, such as scheduling random sensing periods to differentiate between a legitimate signal and a false/spoofed signal, scheduling collaborative sensing between various cognitive communications devices, authenticating the sensed signals including the geolocation information, and/or demodulating and decoding signals that have been detected to authenticate them. Security Sublayers 1 and 3 may be used, for example, to authenticate the co-existence information received from the neighboring cells. Security Sublayer 4 may, for example, authenticate any information that comes into the SM and provides protection for any information that goes out of SM. Security Sublayer 4 may also be used to protect the SM from mis-configuration. The functions of Security Sublayer 4 can be moved, for instance, to the NCMS. Security Sublayer 7 may be used to provide, for example, authentication mechanisms for the raw data in terms of sensing information and geolocation information that is coming into the SM. Security Sublayer 7 may also undertake functions such as fingerprinting of the signals, and other such functions.

FIG. 5 illustrates architecture similar to that shown in FIG. 4 but replaces the MLME, PLME, CSME, CSME-MLME SAP, and MLME-PLME SAP blocks with the Management Information Base (MIB) block. In addition, only two SAPs are defined between the NCMS and the MIB, including the Management SAP (M-SAP) used for the exchange of time insensitive configuration information, and the Control SAP (C-SAP) used for the exchange of the time critical information. Furthermore, the optional Security Sublayers 1, 3, 4, 5, and 7 are included into the respective Layers in the Data and the Cognitive Planes. These Security Sublayers may also be thought of as Security Functions. The dotted lines around these Security Sublayers indicate that these Sublayers may be implemented, for example, as separate modules or their functionality can be an integral part of the layer at which they reside. As previously explained, the MIB acts as a database, storing the primitives that are needed to configure the device and that can be exchanged with the network or the SME. In one particular embodiment, some of the values inside this MIB are pre-defined, whereas other values get populated during the system initialization and operation.

FIG. 6 shows a management reference model of a centralized cognitive network such as an 802.22 system, in accordance with an embodiment of the present invention. The network includes a Network Management System, a number of MIB managed nodes, and a Network Control System. In one specific such embodiment, the managed nodes, including both Base Station (BS) and Customer Premises Equipment (CPE), collect and store the managed objects in the format of Cognitive Communication System Interface MIB (e.g., wranIfMib) and Device MIB (e.g., wranDevMib) that are made available to Network Management System via management protocols, such as Simple Network Management Protocol (SNMP). Unmanaged BS/CPE nodes do not collect this information. The Network Control System includes the service flow and the associated QoS information that are populated to BS when a CPE nodes that enter into a BS network. The management information between CPE and BS is carried, for example, over the secondary management connection for the managed CPE. If the secondary management connection does not exist, then SNMP messages (or other suitable management protocol messages) may go through another interface in the CPE or on a transport connection over the air interface. Examples of services provided by the NCMS include: AAA Services, RRM Services, Security Services, Service Flow Management Services, Location Based Services (LBS) management, and Network Management Services. The NCMS can be interfaced to CPE/BS nodes, for example, through various SAPs such as the M-SAP and the C-SAP.

Figure 7A:
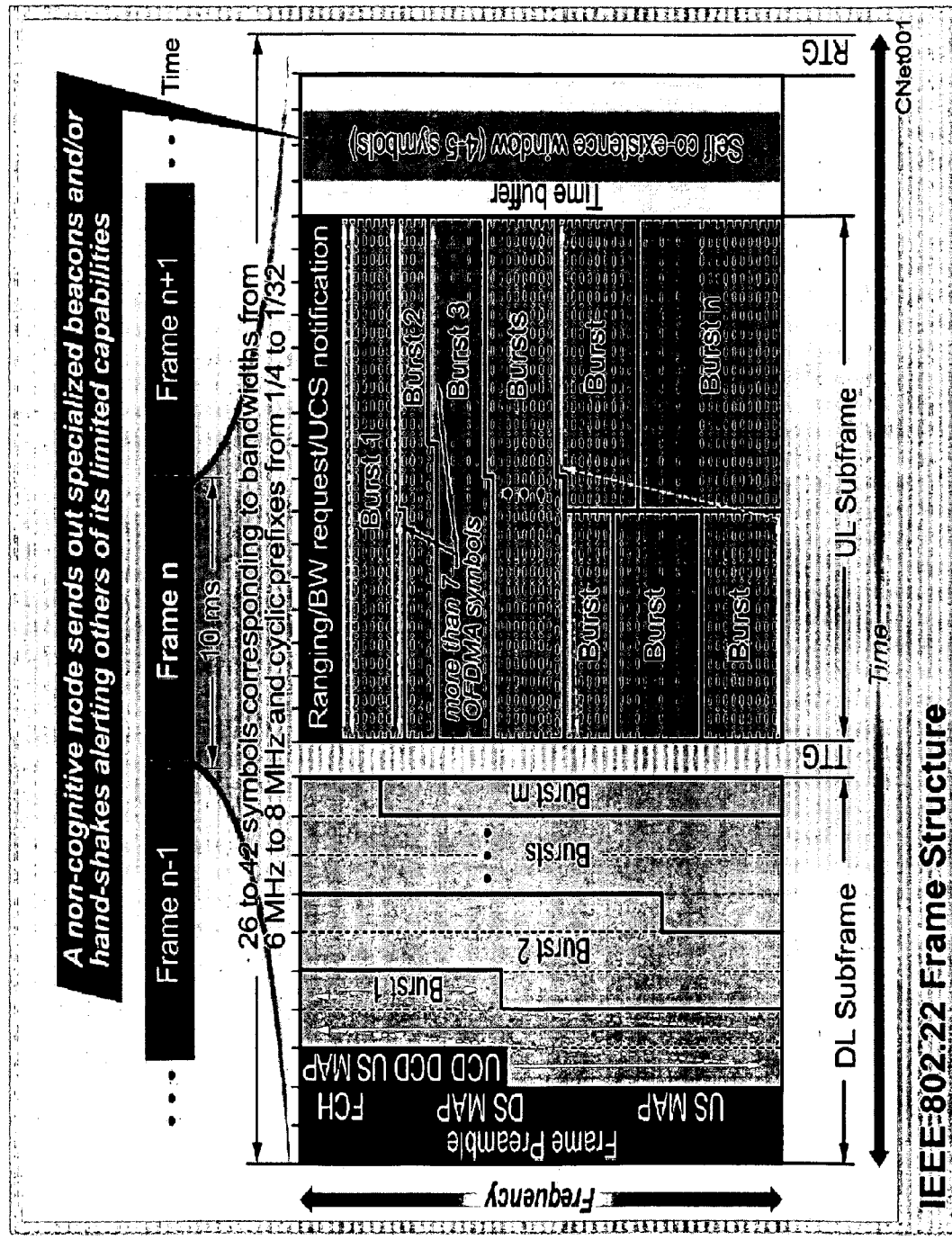
FIG. 7a shows how a cognitive node and a non-cognitive node may exchange information using the self co-existence windows as well as the DL and UL slots, in accordance with an embodiment of the present invention.

FIG. 7a shows how a cognitive node and a non-cognitive node may exchange information using the self co-existence windows as well as the downlink (DL) and uplink (UL) slots, in accordance with an embodiment of the present invention. The co-existence information may include, for example, sensing, inter-system synchronization, co-existence information exchange, interference free scheduling, dynamic resource renting and offering, backhaul message passing, and channel sharing using the self co-existence windows as well as the DL and UL slots.

In this particular example, an IEEE 802.22 frame structure is used, wherein a non-cognitive node sends out specialized beacons and/or hand-shakes alerting other of its limited capabilities. As can be seen, the frame structure includes a DL subframe, UL subframe, and a time buffer. As conventionally done, the transmit/receive transition gap (TTG) provides a gap between the downlink burst and the subsequent uplink burst in a time-division duplexing (TDD) transceiver, and the receive/transmit transition gap (RTG) provides a gap between the uplink burst and the subsequent downlink burst in a TDD transceiver.

Figure 7B:
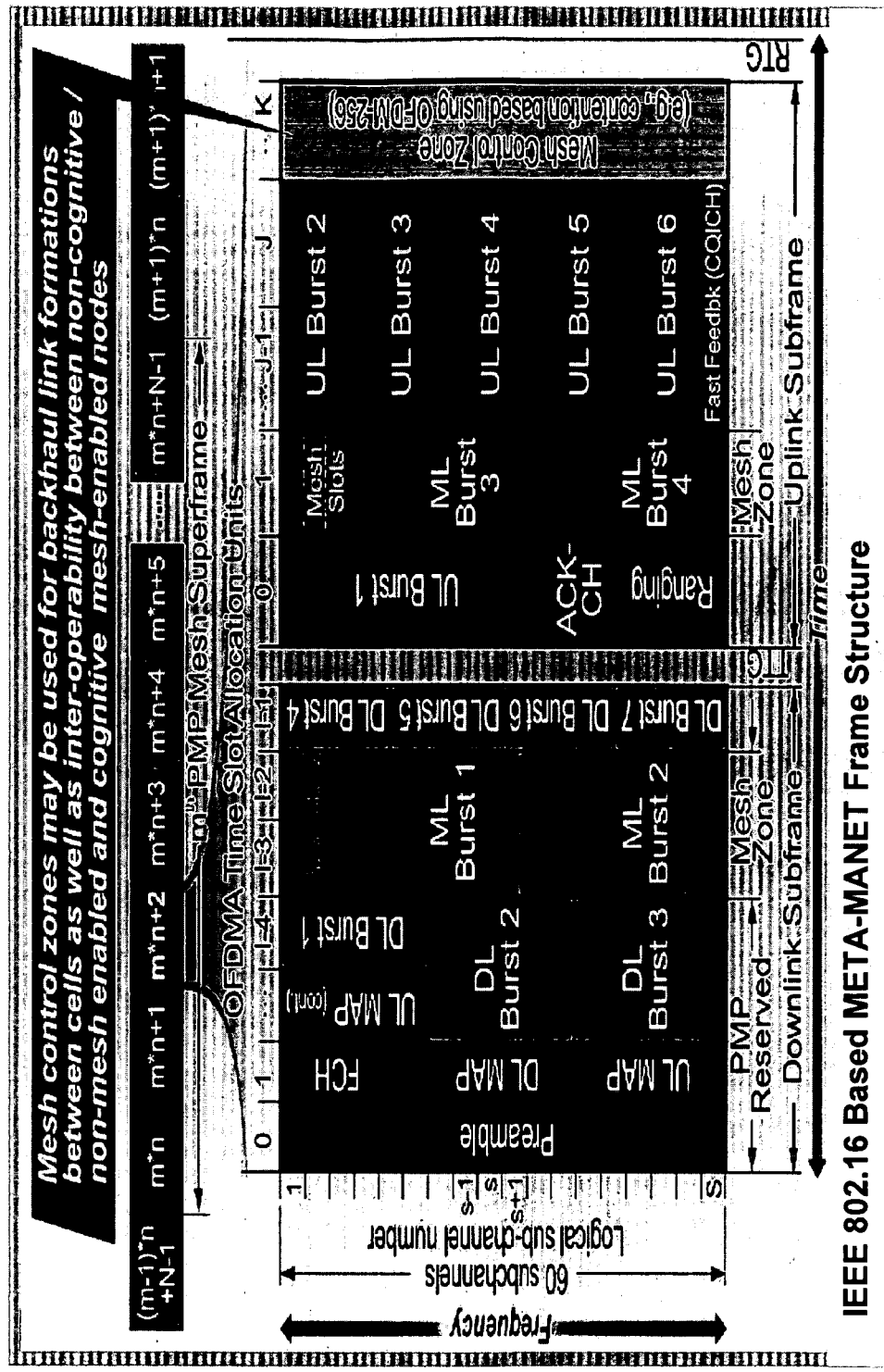
FIG. 7b is similar to FIG. 7a but it additionally shows how mesh and non-mesh nodes can exchange information, in accordance with an embodiment of the present invention.

FIG. 7b is similar to FIG. 7a but it additionally shows how mesh and non-mesh nodes can exchange information, in accordance with an embodiment of the present invention. In this particular example, an IEEE 802.16 based META-MA-NET frame structure is used, wherein a non-cognitive node sends out specialized beacons and/or hand-shakes alerting other of its limited capabilities. As can be seen, the frame structure includes a DL subframe, UL subframe, and a mesh control zone. The TTG and RTG gaps are provided, as conventionally done. The mesh control zone may be used for backhaul link formations between cells, as well as for interoperability between non-cognitive/non-mesh enabled and cognitive mesh enabled nodes.

As will be appreciated in light of this disclosure, some embodiments of the present invention can be implemented to satisfy the increasing need for cognitive radios, especially in the VHF-UHF, ISM, and UNII bands. It will also be appreciated that some embodiments of the present invention are particularly well-adapted for use in military radios, so as to enable cognitive communications. It will further be appreciated that some embodiments of the present invention are specifically targeted to the commercial IEEE 802.22 standard for unlicensed cognitive use of television broadcasting bands.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A cognitive radio communications system, comprising:
a cognitive device, the device including:
    a Data Plane including Physical (PHY) and Media Access Control (MAC) Layers operatively coupled to one another;
    a Management Plane having a Management Information Base (MIB) configured to interface with each of the MAC and PHY Layers and storing primitives used to configure the system, and one or more modules configured to interface the MIB to at least one of a Station Management Entity (SME) and a Network Control and Management System (NCMS) configured to control operation of the system;
    a Cognitive Plane having a Spectrum Manager (SM) and one or more Security Sublayers between the SM and the Management Plane, the Cognitive Plane configured to interface with the MIB and determine whether additional resources including a wireless spectrum are available to enable communication; and
    at least one of a Service Access Point (SAP) and/or an informal interface separating the Cognitive Plane from the Management Plane and the Data Plane, such that the Cognitive Plane and its functions are partitioned from and implemented separately from the Management Plane and the Data Plane, thereby allowing interoperability between cognitive devices and non-cognitive devices such that a non-cognitive device may receive information on spectrum access from a cognitive device.

2. The system of claim 1, wherein the Cognitive Plane further includes a Spectrum Sensing Function (SSF), and a Geolocation (GL) function, wherein the SSF is for detecting signals in a given channel and the GL function is for providing geolocation information, and the SM determines whether to transmit information on the given channel based on sensing information received from the SSF and geolocation information received from the GL function.

3. The system of claim 2, wherein:
the SM is further configured as a Signal Space Manager (SSM) capable of managing signal space of system in the context of at least one of space, time, frequency, spectrum, modulation, coding, power, and location; and the SSF is further capable of at least one of clustering of the sensing information and signal classification.

4. The system of claim 2, further comprising:
an SM-SSF Service Access Point (SAP) for operatively coupling the SM to the SSF function; and
an SM-GL SAP for operatively coupling the SM to the GL function.

5. The system of claim 2, wherein the Cognitive Plane further comprises at least one of:
one or more Security Sublayers between the SM and the SSF; and
one or more Security Sublayers between the SM and the GL function.

6. The system of claim 5, wherein the one or more Security Sublayers included in the system are used for at least one of:
authentication of detected signals;
authentication of geolocation information;
tamper-proofing SM functionality;
authentication of system co-existence information;
detection and reporting of spurious transmissions; and
protection of sensitive information relevant to spectrum availability and/or usage.

7. The system of claim 5, wherein the one or more Security Sublayers included in the system are used for at least one of:
scheduling random cognitive device sensing to distinguish between a legitimate or malicious activity;
scheduling co-operative sensing via a collection of nodes to distinguish between legitimate and malicious activity; and
finger printing of detected signals.

8. The system of claim 1, further comprising:
a Convergence Sublayer operatively coupled to the MAC Layer and for converting data to/from a format compatible with the MAC Layer and communicating with higher layers operatively coupled to the system.

9. The system of claim 1, wherein the Data Plane further comprises:
one or more Security Sublayers for securing communication between the MAC Layer and the PHY Layer.

10. The system of claim 1, wherein the one or more modules for interfacing the MIB comprise:
a Management SAP for exchanging time-insensitive configuration information between the MIB and the at least one of the SME or the NCMS; and
a Control SAP used for exchanging time-sensitive information between the MIB and the at least one of the SME or the NCMS.

11. The system of claim 10, wherein values inside the MIB are at least one of pre-defined values, values that are populated during system initialization, and values that are populated during system operation.

12. The system of claim 1, wherein the Cognitive Plane further comprises:
a Policy Engine for defining system and network policies; and
a Learning and Reasoning Module for keeping track of at least one of signal behavior, user behavior, system behavior, friendly operators, and malicious operators.

13. The system in claim 2, wherein at least one of the Spectrum Manager (SM), Spectrum Sensing Function (SSF), and Geolocation (GL) function are implemented as separate modules on a network including the system.

14. The system of claim 1, wherein the Cognitive Plane further comprises:
a Security Sublayer for securing communication between the SM and the MIB.

15. The system of claim 1, wherein the system is associated with a communication frame structure, and cognitive and non-cognitive devices exchange information using self co-existence windows of the frame structure, whereby cognitive devices transmit information related to at least one of the resources, the system, and network policies, and whereby non-cognitive devices receive information related to at least one of the resources, the system, and network policies.

16. The system of claim 1, wherein the system associated with a communication frame structure, and cognitive mesh-enabled and non-cognitive non-mesh-enabled devices exchange information using mesh control zones of the frame structure, whereby cognitive devices transmit information related to at least one of the resources, the system, and network policies, and whereby non-cognitive devices receive information related to at least one of the resources, the system, and network policies.

17. The system of claim 1, wherein the system is associated with a communication frame structure and at least one of mesh control zones and self co-existence windows of the frame structure are used for backhaul link formations between cells.

18. A cognitive radio communications system, comprising:
a cognitive device, the device including:
a Data Plane including Physical (PHY) and Media Access Control (MAC) Layers operatively coupled to one another;
a Management Plane having a Management Information Base (MIB) configured to interface with each of the MAC and PHY Layers and storing primitives used to configure the system, and one or more modules configured to interface the MIB to at least one of a Station Management Entity (SME) and a Network Control and Management System (NCMS) configured to interface operation of the system, wherein the one or more modules configured to interface the MIB include a Management SAP for exchanging time-insensitive configuration information between the MIB and the at least one of the SME or the NCMS, and a Control SAP used for exchanging time-sensitive information between the MIB and the at least one of the SME or the NCMS, wherein values inside the MIB are at least one of pre-defined values, values that are populated during system initialization, and values that are populated during system operation;
a Cognitive Plane having a Spectrum Manager (SM), a Spectrum Sensing Function (SSF), a Geolocation (GL) Function, and one or more Security Sublayers between the SM and the Management Plane, the Cognitive Plane configured to interface with the MIB and determine whether additional resources including a wireless spectrum are available to enable communication, wherein the SSF is for detecting signals in a given channel and the GL function is for providing geolocation information, and the SM determines whether to transmit information on the given channel based on sensing information received from the SSF and geolocation information received from the GL function; and
at least one of a Service Access Point (SAP) and/or an informal interface separating the Cognitive Plane from the Management Plane and the Data Plane, such that the Cognitive Plane and its functions are partitioned from and implemented separately from the Management Plane and the Data Plane, thereby allowing interoperability between cognitive devices and non-cognitive devices such that a non-cognitive device may receive information on spectrum access from a cognitive device.

19. The system of claim 18, wherein:
the SM is further configured as a Signal Space Manager (SSM) capable of managing signal space of system in the context of at least one of space, time, frequency, spectrum, modulation, coding, power, and location; and
the SSF is further capable of at least one of clustering of the sensing information and signal classification.

20. The system of claim 18, wherein the Cognitive Plane further comprises at least one of:
one or more Security Sublayers between the SM and the SSF; and
one or more Security Sublayers between the SM and the GL function;
wherein the one or more Security Sublayers are used for at least one of:
authentication of detected signals;
authentication of geolocation information;
tamper-proofing SM functionality;
authentication of system co-existence information;
detection and reporting of spurious transmissions;
protection of sensitive information relevant to spectrum availability and/or usage;
scheduling random cognitive device sensing to distinguish between a legitimate or malicious activity;
scheduling co-operative sensing via a collection of nodes to distinguish between legitimate and malicious activity; and
finger printing of detected signals.

21. A cognitive radio communications system, comprising:
a cognitive device, the device including:
a Data Plane including Physical (PHY) and Media Access Control (MAC) Layers operatively coupled to one another;
a Management Plane having a Management Information Base (MIB) configured to interface with each of the MAC and PHY Layers and storing primitives used to configure the system, and one or more modules configured to interface the MIB to at least one of a Station Management Entity (SME) and a Network Control and Management System (NCMS) configured to control operation of the system, wherein the one or more modules configured to interface the MIB include a Management SAP for exchanging time-insensitive configuration information between the MIB and the at least one of the SME or the NCMS, and a Control SAP used for exchanging time-sensitive information between the MIB and the at least one of the SME or the NCMS, wherein values inside the MIB are at least one of pre-defined values, values that are populated during system initialization, and values that are populated during system operation;
a Cognitive Plane having a Spectrum Manager (SM), a Spectrum Sensing Function (SSF), a Geolocation (GL) Function, and one or more Security Sublayers between the SM and the Management Plane, the Cognitive Plane configured to interface with the MIB and determine whether additional resources including a wireless spectrum are available to enable communication, wherein the SSF is for detecting signals in a given channel and the GL function is for providing geolocation information, and the SM determines whether to transmit information on the given channel based on sensing information received from the SSF and geolocation information received from the GL function, the Cognitive Plane further including a Policy Engine for defining system and network policies, and a Learning and Reasoning Module for keeping track of at least one of signal behavior, user behavior, system behavior, friendly operators, and malicious operators; and
at least one of a Service Access Point (SAP) and/or an informal interface separating the Cognitive Plane from the Management Plane and the Data Plane, such that the Cognitive Plane and its functions are partitioned from and implemented separately from the Management Plane and the Data Plane, thereby allowing interoperability between cognitive devices and non-cognitive devices such that a non-cognitive device may receive information on spectrum access from a cognitive device;
wherein the system is associated with a communication frame structure and at least one of mesh control zones and self co-existence windows of the frame structure are used for backhaul link formations between cells.

* * * * *